(12) United States Patent
Millard et al.

(10) Patent No.: US 6,290,763 B1
(45) Date of Patent: Sep. 18, 2001

(54) AZO DYES AND COMPOSITIONS COMPRISING SUCH DYES

(75) Inventors: Christine Millard; Peter Gregory; Roy Bradbury, all of Manchester (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/269,061

(22) PCT Filed: Sep. 5, 1997

(86) PCT No.: PCT/GP97/02377

§ 371 Date: Mar. 18, 1999

§ 102(e) Date: Mar. 18, 1999

(87) PCT Pub. No.: WO98/12263

PCT Pub. Date: Mar. 26, 1998

(30) Foreign Application Priority Data

| Sep. 19, 1996 | (GB) | 9619570 |
|---|---|---|
| Sep. 19, 1996 | (GB) | 9619571 |
| Sep. 19, 1996 | (GB) | 9619574 |
| Sep. 19, 1996 | (GB) | 9619575 |
| Sep. 19, 1996 | (GB) | 9619575 |
| Sep. 19, 1996 | (GB) | 9619584 |
| Sep. 19, 1996 | (GB) | 9619585 |
| Sep. 19, 1996 | (GB) | 9619586 |
| Sep. 19, 1996 | (GB) | 9619587 |
| Sep. 19, 1996 | (GB) | 9619588 |
| Sep. 19, 1996 | (GB) | 9619589 |
| Sep. 19, 1996 | (GB) | 9619590 |
| Sep. 19, 1996 | (GB) | 9619591 |
| Sep. 19, 1996 | (GB) | 9619592 |
| Sep. 19, 1996 | (GB) | 9619593 |
| Sep. 19, 1996 | (GB) | 9619612 |

(51) Int. Cl.$^7$ .......................... C09D 11/02; C09B 29/09; B05D 1/26; B32B 3/00

(52) U.S. Cl. .................. 106/31.48; 106/31.77; 534/797; 534/803; 427/466; 428/195

(58) Field of Search ................ 106/31.48, 31.77; 534/797, 803; 427/466; 428/195

(56) References Cited

U.S. PATENT DOCUMENTS

| 4,664,714 | * | 5/1987 | Katsura et al. | 106/31.77 |
|---|---|---|---|---|
| 4,997,919 | * | 3/1991 | Schaulin | 534/797 |
| 5,268,459 | * | 12/1993 | Gregory et al. | 106/31.48 |
| 5,374,301 | * | 12/1994 | Gregory et al. | 106/31.48 |
| 5,451,251 | * | 9/1995 | Mafune et al. | 106/31.48 |
| 5,519,121 | * | 5/1996 | Renner et al. | 534/797 |
| 5,631,352 | * | 5/1997 | Lauk | 534/797 |
| 5,721,344 | * | 2/1998 | Baettig | 534/803 |
| 5,728,201 | * | 3/1998 | Saotio et al. | 106/31.48 |
| 5,753,016 | * | 5/1998 | Hayashi et al. | 106/31.48 |
| 5,844,100 | * | 12/1998 | Baettig | 534/803 |

FOREIGN PATENT DOCUMENTS

| 0468647 | * | 1/1992 | (EP) . |
|---|---|---|---|
| 0612820 | * | 8/1994 | (EP) . |
| 0669381 | * | 8/1995 | (EP) . |
| 0719847 | * | 7/1996 | (EP) . |

* cited by examiner

Primary Examiner—Helene Klemanski
(74) Attorney, Agent, or Firm—Rothwell, Figg, Ernst & Manbeck

(57) ABSTRACT

Azo dyes of Formula (1) have utility as dyes for ink-jet printing, where Formula (1) represents:

Formula (1)

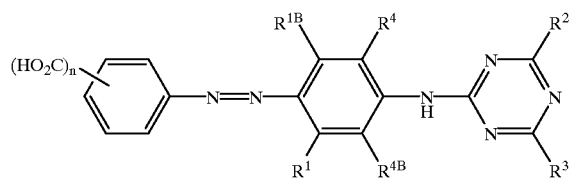

which comprises any suitable form of the compound: such as salt; stereoisomer, zwitterion, polymorph, complex, isotopic form, combinations thereof in the same species and mixtures thereof; where: n represents from 1 to 5 inclusive; $R^1$, $R^{1B}$, $R^4$ and $R^{4B}$ each independently comprises at least one of the following substituents, optionally substituted:

H, $C_{1-8}$alkyl; $C_{1-8}$alkoxy; —NHCOH, $C_{1-8}$alkylcarbonylamino; and —NHCONR$^5$R$^6$ where $R^5$ and $R^6$ each independently comprises at least one of the following substituents: H, $C_{1-8}$alkyl and aryl; and $R^2$ and $R^3$ each independently comprises at least one of the following substituents, optionally substituted:

H; $C_{1-8}$alkoxy; -NHC$_{1-8}$alkyleneOH, —SC$_{1-8}$-alkyleneSO$_3$H;

-NHC$_{1-8}$alkyleneN(C$_{1-8}$alkyl)$_2$;

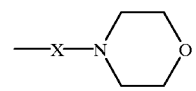

where X comprises one of the following: —NHC$_{1-8}$alkylene;

—NHphenylSO$_2$NHC$_{1-8}$alkylene; and a direct link,

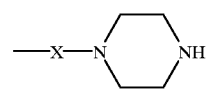

where X comprises one of the following: —NHC$_{1-8}$alkylene;

—NHphenylSO$_2$NHC$_{1-8}$alkylene; and a direct link;

Formula (2)

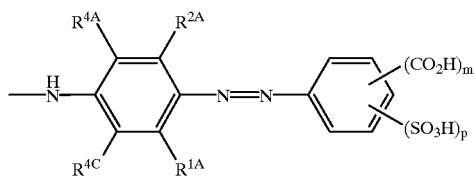

a moiety of Formula (2) where m and p is each independently from 0 to 5 inclusive, provided that (m+p) is from 1 to 5 inclusive; and $R^{1A}$, $R^{2A}$, $R^{4A}$ and $R^{4C}$ each independently comprises at least one of those optionally substituted substituents as defined herein for $R^1$, $R^2$, $R^4$ and $R^{4B}$ respectively; and any other suitable labile or non-labile substituent not mentioned above; where the optional substituents herein comprise: $C_{1-4}$alkyl (optionally substituted with at least one halo)., $C_{1-4}$alkoxy (optionally substituted with at least one halo), carboxy, sulpho, hydroxy, amino, mercapto, cyano, nitro and halo.

14 Claims, No Drawings

AZO DYES AND COMPOSITIONS COMPRISING SUCH DYES

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided at least one compound of Formula (1):

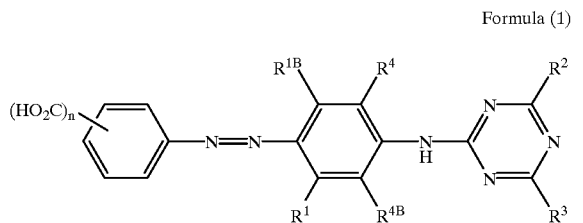

Formula (1)

which comprises any suitable form of the compound: such as salt; stereoisomer, zwifterion, polymorph, complex, isotopic form, combinations thereof in the same species and mixtures thereof; where: n represents from 1 to 5 inclusive; $R^1$, $R^{1B}$, $R^4$ and $R^{4B}$ each independently comprises at least one of the following substituents, optionally substituted:

H, $C_{1-8}$alkyl; $C_{1-8}$alkoxy; —NHCOH, $C_{1-8}$alkylcarbonylamino; and —NHCONR$^5$R$^6$
where $R^5$ and $R^6$ each independently comprises at least one of the
following substituents: H, $C_{1-8}$alkyl and aryl; and $R^2$ and $R^3$ each independently comprises at least one of the following substituents, optionally substituted:

H; $C_{1-8}$alkoxy; —NHC$_{1-8}$alkyleneOH, —SC$_{1-8}$-alkyleneSOxhd 3H;
—NHC$_{1-8}$alkyleneN(C$_{1-8}$alkyl)$_2$;

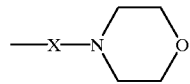

where X comprises one of the following: —NHC$_{1-}$salkylene;
—NHphenylSO$_2$NHC$_{1-8}$alkylene; and a direct link,

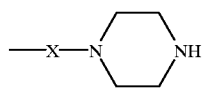

where X comprises one of the following: —NHC$_{1-}$salkylene;

—NHphenylSO$_2$NHC$_{1-8}$alkylene; and a direct link;

Formula (2)

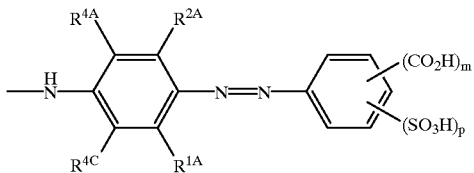

a moiety of Formula(2)
where m and p is each independently from 0 to 5 inclusive, provided that
(m+p) is from 1 to 5 inclusive; and
$R^{1A}$, $R^{2A}$, $R^{4A}$ and $R^{4C}$ each independently comprises at least one of those
optionally substituted subsfituents as defined herein for $R^1$, $R^2$, $R^4$ and $R^{4B}$ respectively; and
any other suitable labile or non-labile substituent not mentioned above; where the optional substituents herein comprise: $C_{1-4}$alkyl (optionally substituted with at least one halo)., $C_{1-4}$alkoxy (optionally substituted with at least one halo), carboxy, sulpho. hydroxy, amino, mercapto, cyano, nitro and halo with the proviso that one of $R^2$ and $R^3$ is a moiety of the Formula (2), then the other $R^2$ or $R^3$ is:

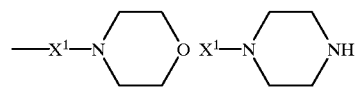

a moiety of Formula (2), SC$_{1-8}$alkyleneSO$_3$H or —NHC$_{1-}$salkyleneN (C$_{1-8}$alkyl)$_2$; wherein X$^1$ is NHC$_{1-8}$alkylene or -NHphenylSO$_{1-8}$alkylene.

When $R^2$ and/or $R^3$ represent a labile atom or group, it is preferably an atom or group which is bound by a chemical bond to the triazine nucleus which is displaceable by a hydroxyl group of cellulose under mildly alkaline aqueous conditions to form a covalent bond between the triazine nucleus and cellulose. Labile atoms and groups that may be represented by $R^2$ and/or $R^3$ independently comprise: halo (preferably F and Cl); sulphonic acid groups; thiocyano groups; optionally substituted quatemary ammonium groups (preferably trialkylammonium groups) and/or optionally substituted pyridinium groups (preferably 3–and 4–carboxy pyridinium groups).

Preferred non-labile groups represented by $R^2$ and/or $R^3$ independently comprise groups of the formulae —OR$^7$, —SR$^8$ and/or —NR$^9$R$^{10}$, more preferably —OH,—NH$_2$, —NH (C$_{1-4}$alkyl) and/or -NH(hydroxyC$_{2-4}$alkyl). In the preceding formulae $R^7$, $R^8$, $R^9$ and/or $R^{10}$ are each independently selected from the following optionally substituted substituents: H; alkyl (preferably C$_{1-10}$alkyl, especially C$_{1-4}$alkyl); cycloalkyl; aryl (preferably phenyl); aralkyl [preferably -(CH$_2$)$_{1-4}$phenyl, especially benzyl]; and $R^9$ and $R^{10}$ together with the nitrogen atom to which they are attached form an optionally substituted 5–or 6–membered ring, preferably an optionally substituted morpholine, piperidine or piperazine ring, more preferably piperazine in which the free ring N-atom is optionally substituted by a C$_{1-4}$alkyl or hydroxy-C$_{2-4}$-alkyl group. When $R^7$, $R^8$, $R^9$ and/or $R^{10}$ is substituted, the substituent is preferably selected from the optional substituents listed above, more preferably is selected from: hydroxy, methyl, methoxy, sulpho and carboxy.

Advantageous dyes of Formula (1) are those in which: n is 2; $R^{1B}$ and $R^{4B}$ represent H; $R^1$ represents H, $C_{1-8}$alkyl; $C_{1-8}$alkoxy; -NHCOH, $C_{1-8}$alkylcarbonylamino; or -NHCONR$^5$R$^6$; $R^4$ represents H, $C_{1-8}$alkyl or $C_{1-8}$alkoxy; and $R^2$ and $R^3$ each independently represents: H; $C_{1-8}$alkoxy; —NHC$_{1-8}$alkyleneOH, —SC$_{1-8}$-alkyleneSO$_3$H; —NHC$_{1-8}$alkyleneN(C$_{1-8}$alkyl)$_2$,

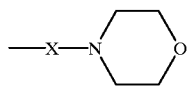

where X is —NHC$_{1-8}$alkylene; or a direct link,

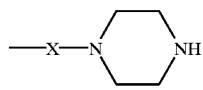

where X is —NHC$_{1-8}$alkylene; or a direct link; and/or a moiety of Formula(2) where m is 2, p is 0 and $R^{4C}$ represents H; with the proviso that when one of $R^2$ and $R^3$ is a moiety of the Formula (2) where m is 2, p is 0 and $R^{4c}$ represents H, then the other of $R^2$ and $R^3$ is

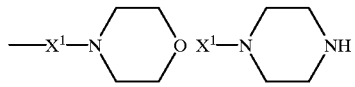

—SC$_{1-8}$alkyleneSO$_3$H, —NHC$_{1-8}$alkyleneN(C$_{1-8}$alkyl)$_2$ or a moiety of Formula (2) where m is 2, p is 0 and $R^{4c}$ is H, wherein $X^1$ is NHC$_{1-8}$alkylene.

Any radical group mentioned above as a substituent refers to a monovalent radical unless otherwise stated. A group which comprises a chain of three or more atoms signifies a group in which the chain wholly or in part may be linear, branched and/or form a ring (including spiro and/or fused rings). The total number of certain atoms is specified for certain substituents for example $C_{1-n}$alkyl, signifies an alkyl group comprising from 1 to n carbon atoms.. In any of the formulae drawn herein if one or more ring substituents are not indicated as attached to any particular atom on the ring [for example the —CO$_2$H groups in Formula (1)] the substituent may replace any H attached to an atom in the ring and may be located at any available position on the ring. Hydrocarbon substituents or parts of substituents may comprise one or more double and/or triple carbon to carbon bonds and the term 'alkyl' as used herein encompasses alkenyl and alkynyl. The term 'aryl' as used herein comprises any suitable hydrocarbon comprising an aromatic moiety. The term 'halo' as used herein signifies fluoro, chloro, bromo and iodo.

The terms 'acceptable' or 'suitable' (for example with reference to composition ingredients, substituents and/or compounds described herein) will be understood to mean suitable for use in IJP for example by providing desirable properties to the ink or being compatible with any inert carriers and/or diluents suitable for formulating such inks. In relation to the processes described herein suitable compounds are those which will, in addition, undergo the specified reactions. To be particularly acceptable for use in IJP compounds of Formula (1) may be Ames negative.

According to a first preferred aspect of the present invention there is provided at least one mono azo dye of Formula (1), including any suitable salts and tautomers thereof, in which: n is 2; $R^{1B}$, $R^4$ and $R^{4B}$ are all H; $R^1$ is H, $C_{1-4}$alkyl, $C_{1-4}$alkoxy, NHCOH, $C_{1-4}$alkylcarbonylamino, or -NHCONR$^5$R$^6$;

where $R^5$ and $R^6$ is each independently: H, $C_{1-4}$alkyl or aryl; and $R^2$ and $R^3$ is each independently: —NHC$_{1-4}$alkyleneOH, —SC$_{1-4}$alkyleneSO$_3$H, —NHC$_{1-4}$alkyleneN(C$_{1-4}$-alkyl)$_2$; or

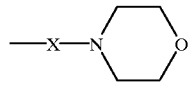

where X is —NHC$_{1-4}$alkylene or a direct link.

More preferred monoazo dyes of Formula (1) in this first preferred aspect of the invention are those in which: the carboxy groups on the phenyl ring in Formula (1) are meta to the azo group; and $R^1$ is methyl or NHCOCH$_3$.

According to a second preferred aspect of the present invention there is provided at least one bisazo dye of Formula (1), including any suitable salts and tautomers thereof, in which: n is 2; $R^{1B}$ and $R^{4B}$ are both H; $R^1$ and $R^{1A}$ is each independently: H, $C_{1-4}$alkoxy, NHCOH, $C_{1-4}$alkylcarbonylamino, or NHCONR$^5$R$^5$;

where $R^5$ and $R^6$ is each independently H, $C_{1-4}$alkyl or aryl; $R^4$ and $R^{4A}$ is each independently H, $C_{1-4}$alkyl or -$C_{1-4}$alkoxy; $R^2$ is a moiety of Formula (2) where m is 2, p is 0 and $R^{4C}$ is H; $R^{2A}$ is H, or $C_{1-4}$alkoxy; and $R^3$ is: —NHC$_{1-4}$alkyleneOH, -SC$_{1-4}$alkyleneSO$_3$H, -NHC$_{1-4}$alkyleneN(C$_{1-4}$-alkyl)$_2$;

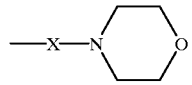

where X is —NHC$_{1-4}$alkylene or a direct link; provided that when $R^1$ and $R^2$ are methyl, and $R^{1A}$, $R^4$ and $R^{4A}$ are all H; $R^3$ is other than —NHC$_2$H$_4$OH.

More preferred bisazo dyes of Formula (1) in this second preferred aspect of the invention are those in which: the carboxy groups on the phenyl rings in Formulae (1) and (2) are meta to the azo group; $R^1$ and $R^{1A}$ is each independently methoxy; -NHCOCH$_3$., or —NHCONH$_3$; and $R^4$ and $R^{4A}$ is each independently H or methoxy.

According to a third preferred aspect of the present invention there is provided at least one monoazo dye of Formula (1) (which comprises at least one piperazinyl substituent), including any suitable salts and tautomers thereof, in which:

n is 2;

$R^{1B}$, $R^4$ and $R^{4B}$ are all H;

$R^1$ is H, $C_{1-4}$alkyl, $C_{1-4}$alkoxy, NHCOH, $C_{1-4}$alkylcarbonylamino, or NHCONR$^5$R$^6$ where $R^5$ and $R^6$ is each independently H, $C_{1-4}$alkyl or aryl; and $R^2$ and $R^3$ is each independently: —NHC$_{1-}$ 4alkyleneOH, —SC$_{1-4}$alkyleneSO$_3$H, —NHC$_{1-4}$alkyleneN(C$_{1-4}$-alkyl)$_2$,

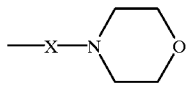

where X is —NHC$_{1-4}$alkylene or a direct link;

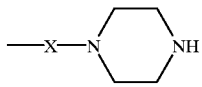

where X is —NHC$_{1-4}$alkylene or a direct link; provided that at least one of R$^2$ and R$^3$ is

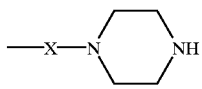

More preferred monoazo dyes of Formula (1) in this third preferred aspect of the invention are those in which: the carboxy groups on the phenyl ring in Formula (1) are meta to the azo group; R$^1$ is methyl, —NHCOCH$_3$; —NHCONH$_2$; or methoxy; and R$^4$ is methoxy.

According to a fourth preferred aspect of the present invention there is provided at least one bisazo dye of Formula (1) (which comprises at least one piperazinyl substituent), including any suitable salts and tautomers thereof, in which:
n is 2;
R$^{1B}$ and R$^{4B}$ are both H;
R$^1$ and R$^{1A}$ is each independently: H, C$_{1-4}$alkyl, C$_{1-4}$alkoxy; —NHCOH,
C$_{1-4}$alkylcarbonylamino or NHCONR$^5$R$^6$
where R$^5$ and R$^6$ is each independently H, C$_{1-4}$-alkyl or aryl;
R$^4$ and R$^{4A}$ is each independently H, C$_{1-4}$alkyl or C$_{1-4}$alkoxy;
R$^2$ is a moiety of Formula (2) where m is 2; p is 0 and R$^{4C}$ is H;
R$^{2A}$ is H; and
R$^3$ is

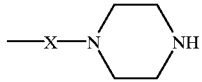

R$^3$ is where X is —NHC$_{1-4}$alkylene or a direct link.

More preferred bisazo dyes of Formula (1) in this fourth preferred aspect of the invention are those in which: the carboxy groups on the phenyl rings in Formulae (1) and (2) are meta to the azo group; R$^1$ and R$^{1A}$ is each independently methoxy; —NHCOCH$_3$ or —NHCONH$_2$; and R$^4$ and R$^{4A}$ is each independently H or methoxy.

Specific compounds of Formula (1) comprise those compounds exemplified herein; any suitable salts thereof, preferably the ammonium salts; and any suitable mixtures thereof.

Compounds of Formula (1) may be in the form as shown in the structures herein (e.g. free acid form) but are preferably in the form of salts. Salts of Formula (1) may be formed from one or more organic and/or inorganic base(s) or acid(s) and compounds of Formula (1) which are acidic and/or basic (for example acid and/or base addition salts). Salts of Formula (1) comprise all acceptable salts that may be formed from monovalent and/or multivalent acids and/or bases [for example those formed by partial neutralisation of carboxylic acids of Formula (1) where n+m>1]. Salts of Formula (1) also comprise all enantiomeric salts formed with acceptable chiral acids and/or bases and/or any mixtures of enantiomers of such salts (for example racemic mixtures). Preferred salts are alkali metal salts, especially lithium, sodium and potassium salts, ammonium and substituted ammonium salts. Especially preferred salts are salts with ammonia and volatile amines. The dyes may be converted into a salt using known techniques. For example, an alkali metal salt of a dye may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis. The present invention comprises all acceptable salts of Formula (1) and any suitable mixtures thereof.

Certain compounds of Formula (1) may exist as one or more stereoisomers, for example, enantiomers, diastereoisomers, geometric isomers, tautomers, conformers and/or suitable combinations thereof possible in the same species. It is particularly preferred that dyes of Formula (1) comprise all tautomeric forms including those not specifically illustrated herein. The present invention comprises all acceptable stereoisomers of compounds of Formula (1) and any suitable mixtures thereof.

Certain compounds of Formula (1) may exist as one or more zwitterions, for example, species which comprise two or more centres of ionic charge. The present invention comprises all acceptable zwitterions of Formula (1) and any suitable mixtures thereof.

Certain compounds of Formula (1) may exist as one or more polymorphs, for example, phases, crystalline forms, amorphous forms, solid solutions, interstitial compounds and/or any suitable mixtures thereof. The present invention includes all acceptable polymorphs of Formula (1) and any suitable mixtures thereof.

Certain compounds of Formula (1) may exist in the form of one or more complexes, for example, chelates, solvates, organometallic complexes, and/or complexes with other suitable ligands. Such complexes may be formed between an acceptable substrate in which the compound of Formula (1) and/or the substrate may act as a ligand. The substrate may comprise one or more acceptable solvents to form solvates. The complexes may be non-stoichiometric, for example if the complex is a hydrate it may comprise a hemihydrate, monohydrate and/or dihydrate. The present invention includes all acceptable complexes of Formula (1) and any suitable mixtures thereof.

Certain compounds of Formula (1) may exist as one or more isotopic forms in which one or more atoms in Formula (1) comprise one or more suitable isotopes. The natural ratios of various isotopes may be altered by suitable means, for example certain $^{12}$C atoms in certain compounds of Formula (1) may be substantially replaced by the less common $^{14}$C and/or $^{13}$C isotopes. Optionally certain isotopic forms of Formula (1) may be radio-active. Certain of the isotopic forms of Formula (1) may be used as means for selective imaging in imaging devices (for example devices using X-rays, positron emission tomography and/or nuclear magnetic resonance); and/or as tools to investigate the mode of action of compounds of Formula (1) in IJP. The present invention includes all acceptable, isotopic forms of Formula (1) and any suitable mixtures thereof.

The present invention relates to all compounds of Formula (1) even those which may not be directly acceptable for use in IJP because they exhibit undesirable properties. Such compounds may nevertheless have utility in the field of the present invention for example as intermediates in the preparation and/or purification of acceptable compounds of Formula (1) and/or as research tools and/or diagnostic aids in relation to IJP.

Compounds of Formula (1) may be prepared the methods described below and by other suitable methods analogous to those described in the art for similar azo compounds.

Compounds of Formula (1) in which $R^3$ is other than a moiety of Formula (2) may be prepared by condensing a suitable compound of Formula (3):

Formula (3)

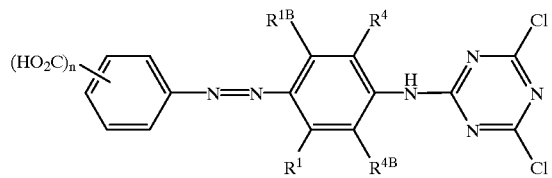

with suitable compounds of formulae $R^2H$ and $R^3H$.

Compounds of Formula (1) in which $R^2$ is a moiety of Formula (2) may be prepared by condensing a suitable compound of Formula (1) in which $R^3$ is Cl with a compound of formula $R^3H$ in which $R^3$ is other than Cl.

Compounds of Formula (1) in which $R^2$ is a moiety of Formula (2) and $R^3$ is Cl may be prepared by condensing a suitable compound of Formula (3) preferably in the presence of a base with a suitable compound of Formula (4):

Formula (4)

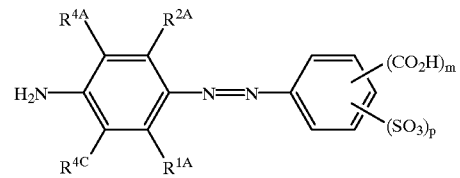

Compounds of Formula (3) may be prepared by condensing with cyanuric chloride, preferably in the presence of a base, a suitable azo compound of Formula (5):

Formula (5)

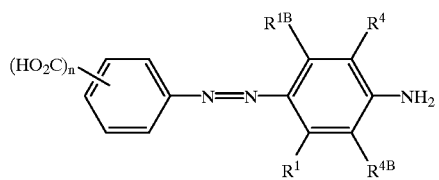

Compounds of Formula (4) may be prepared by diazotising a suitable aromatic amine of Formula (6):

Formula (6)

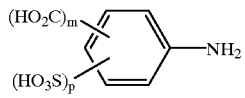

and coupling the resultant diazonium salt with a suitable compound of Formula (7):

Formula (7)

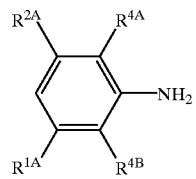

Compounds of Formula (5) may be prepared diazotising a suitable aromatic amine of Formula (6) to form the corresponding diazonium salt and coupling with a suitable compound of Formula (8):

Formula (8)

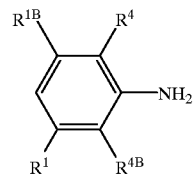

The reactions leading to the formation of the compounds of Formula (1) may be performed under conditions that have been described in the art. For example diazotisation is preferably performed at a temperature below 6° C., more preferably at a temperature in the range −10° C. to 5° C. Preferably the diazotisation is performed in water, more preferably at a pH below 7. Dilute mineral acids, such as HCl or $H_2SO_4$, are often used to achieve the desired acidic conditions. The azo dyes may be isolated by known methods such as spray drying or precipitation followed by fiftration.

An aspect of the present invention comprises an ink comprising at least one compound of Formula (1) as defined herein and a suitable medium.

According to a further aspect of the present invention there is provided an ink comprising:
 (a) from 0.01 to 30 parts of a dye of the Formula (1); and
 (b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise: $C_{1-6}$-alkanols, preferably methanol, ethanol, n-propanol, isopropanol, n-butanol, sec-butanol, tert-butanol, n-pentanol, cydopentanol and/or cyclohexanol; linear amides, preferably dimethylformamide and/or dimethylacetamide; ketones andlor ketone-alcohols, preferably acetone, methyl ether ketone, cyclohexanone and/or diacetone alcohol; water-misdble ethers, preferably tetrahydrofuran and/or dioxane; diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol); triols, preferably glycerol andlor 1,2,6-hexanetriol; $C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy]-ethanol, 2-[2-(2-ethoxyethoxy)-ethoxy]-ethanol and/or ethyleneglycol monoallyl ether}; cyclic amides, preferably 2-pyrrolidone, N-methyl-2-pyrrolidone, N-ethyl-2-pyrrolidone, caprolactam andlor 1,3-dimethylimidazolidone; cyclic esters, preferably caprolactone; sulphoxides, preferably dimethyl sulphoxide andlor sulpholane; and/or any suitable mixtures thereof.

More preferred water-soluble organic solvents are selected from: cyclic amides (e.g. 2-pyrrolidone, N-methyl-pyrrolidone and N-ethyl-pyrrolidone); diols, (e.g. 1,5-pentane diol, ethyleneglycol, thiodiglycol, diethyleneglycol and triethyleneglycol); $C_{1-4}$alkyl ethers of diols (e.g. 2-methoxy-2-ethoxy-2-ethoxyethanol); and any suitable mixtures thereof.

A preferred liquid medium comprises:
(a) from 75 to 95 parts water; and
(b) from 25 to 5 parts in total of one or more solvents selected from: diethylene glycol, 2-pyrrolidone, thiodiglycol, N-methylpyrrolidone, cyclohexanol, caprolactone, caprolactam and pentane-1,5-diol; where the parts are by weight and the sum of the parts (a)+(b)=100.

Another preferred liquid medium comprises:
(a) from 60 to 80 parts water,
(b) from 2 to 20 parts diethylene glycol; and
(c) from 0.5 to 20 parts in total of one or more solvents selected from: 2-pyrrolidone, N-methylpyrrolidone, cyclohexanol, caprolactone, caprolactam, pentane-1,5-diol and thiodiglycol; where the parts are by weight and the sum of the parts (a)+(b)+(c)=100.

Examples of further suitable media for inks of the present invention comprise a mixture of water and one or more organic solvents are described in U.S. Pat. Nos. 4,963,189, 4,703,113, 4,626,284 and EP 0425150-A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The dye of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying an ink comprising a dye of Formula (1) to the substrate by means of an ink jet printer. The ink used in this process is preferably an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper. Preferred papers are plain or treated papers which may have an acid, alkaline or neutral character.

A further aspect of the present invention provides a paper, an overhead projector slide or a textile material printed with an ink and/or a dye as defined herein and/or by means of a process as defined herein.

When the substrate is a textile material the ink according to the invention is preferably applied thereto by:

i) applying the ink to the textile material using an ink jet printer; and
ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

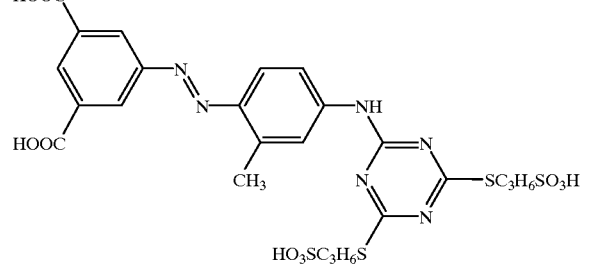

-continued i) Preparation of

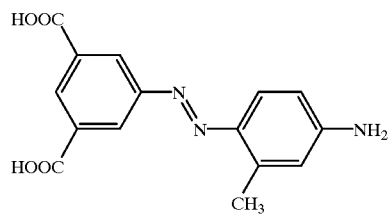

5-Aminoisophthalic acid (36.2 g) was dissolved in water (1 dm$^3$) adjusted to pH 8.0 with NaOH solution and sodium nitrite (13.8 g) was added. The resulting solution was poured onto a mixture of ice, water and HCl (50 cm$^3$) over 10 minutes at a temperature of between 0 to 10° C. and stirred for 2 hours also at 0 to 10° C. Excess nitrite was removed with sulphamic acid.

m-Toluidine (21.4 g) was stirred in water (500 cm$^3$) and concentrated HCl (25 cm$^3$) was added. This solution was poured into the above prepared diazo solution and the pH of the resultant solution was adjusted to 4 with sodium acetate. The reaction mixture was stirred at room temperature for 16 hours and then filtered to collect a solid which was dried in an oven at 65° C. under reduced pressure to give 65.6 g of product.

ii) The compound (8.5 g) from i) above was added to water (300 cm$^3$) at pH 8. The resulting solution was added slowly to a stirred suspension of cyanuric chloride (4.6 g) in acetone (50 cm$^3$). The mixture was then poured onto a mixture of ice and water (100 g) at 0 to10° C. and at pH 6 to 7 and stirred for 2 hours also at 0 to10° C and pH 6 to 7 until thin layer chromatography (TLC) showed that the reaction was complete.

3-Mercapto-1-propane sulphonic acid (4.8 g) was dissolved in water (100 cm$^3$) and added to the mixture which was then stirred at pH 8.0 and room temperature for 16 hours.

A further portion of 3-mercapto-1-propane sulphonic acid (13.5 g) in water (100 cm$^3$) was added to the mixture which was warmed to 50° C. and kept at pH 8 to 9 for 6 hours and then was cooled to room temperature.

Sodium chloride solution (20% w/v) was added to the mixture which was slowly acidified to pH 4 with concentrated HCl. A dry solid was collected by filtration under reduced pressure. The solid product added to water (400 cm$^3$) to form a slurry the pH of which was adjusted to 9 with ammonia solution. The slurry was poured onto concentrated HCl (30 cm$^3$). A solid was collected from the slurry by filtration and then dissolved in ammonia. The pH of the solution was adjusted to 4 with concentrated HCl and the precipitated solid collected by filtration to give the title compound (8.5 g).

EXAMPLE 2

Preparation of

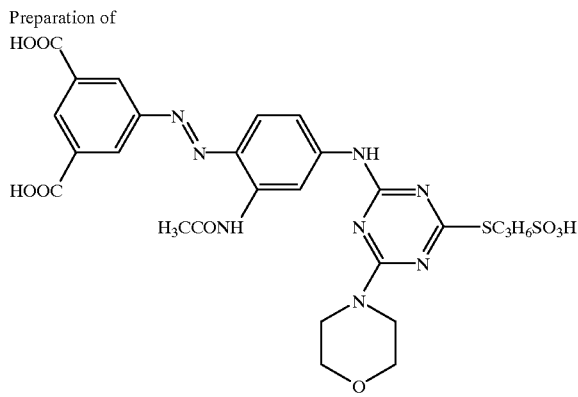

i) Preparation of

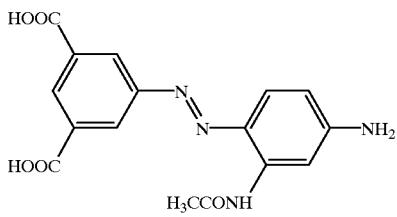

5-Aminoisophthalic acid (36.2 g) was dissolved with stirring in water (400 cm$^3$) the pH of which was adjusted to 8 to 9 with caustic soda solution. Sodium nitrite (15 g) was added and the mixture was stirred to dissolve. Concentrated HCl (100 cm$^3$) in ice was added at 0 to 10° C. and the mixture was stirred for 2 hours also at 0 to 10° C. to diazotise. Excess nitrite was removed with sulphamic acid.

m-Aminoacetanilide (55.5g) was stirred in water (400 cm$^3$) at pH 7 and added to the diazo suspension at 0 to 10° C. and stirred at a pH of 4 to 5 with sodium acetate. The mixture was allowed to warm to room temperature over 16 hours. A solid was collected from the reaction mixture by filtration and then dried in an oven at 60° C. for 16 hours to give 111.1 g of product.

ii) The compound (12.7 g) from i) above was added to water (460 cm$^3$) at pH 8. The resulting solution was added slowly to a stirred suspension of cyanuric chloride (6.9 g) in acetone (75 cm$^3$) and poured into ice (150 g) and stirred at 0 to10° C. and pH 6 to 7 for 2 hours until TLC showed the reaction was complete.

Morpholine (3.6g) was added to the mixture which was then stirred at pH 8 to 9 and room temperature for 16 hours.

3-Mercapto-1-propane sulphonic acid (20.2 g) was added to the mixture which was stirred at 40 to 45° C. at pH 8 to 9 for 5 hours and then was cooled to room temperature.

The mixture was acidified to pH 4 with concentrated HCl and a dry solid was collected by filtration under reduced pressure. The solid obtained was restirred in water (800 cm$^3$) the pH of which was adjusted to 9 with ammonia solution. The mixture was poured onto concentrated HCl (50 cm$^3$) and stirring for 10 minutes and a solid was collected from the mixture by filtration under reduced pressure and dried in an oven at 60° C. for 16 hours to give the title compound (14.6 g).

EXAMPLE 3

Preparation of

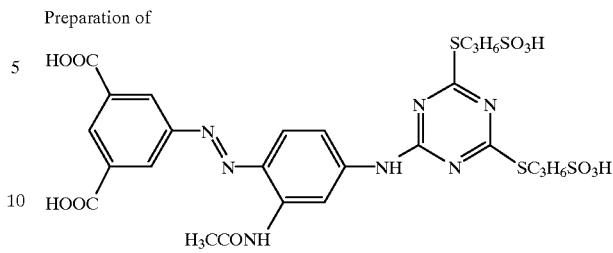

The compound (8.5 g) from Example 2 i) above was added to water (300 cm$^3$) at pH 8. The resulting solution was added slowly to a stirred suspension of cyanuric chloride (4.6 g) in acetone (50 cm$^3$) and poured onto a mixture of ice and water (100 g) at 0 to 10° C. and at pH 6 to 7 then stirred for 2 hours at 0 to 10° C. and pH 6 to 7 until TLC showed the reaction was complete.

3-Mercapto-1-propane sulphonic acid (4.8 g) was dissolved in water (100 cm$^3$) and added to the mixture and stirred for 16 hours at pH 8 to 9 and room temperature.

A further portion of 3-mercapto-1-propane sulphonic acid (13.5 g) in water (100 cm$^3$) was added and the mixture was warmed to 50° C., kept at pH 8 to 9 for 6 hours and then was cooled to room temperature.

Sodium chloride solution (20% w/v) was added to the mixture which was slowly acidified to pH 4 with concentrated HCl. A solid was collected by filtration under reduced pressure. The resultant solid was restirred in water (400 cm$^3$) adjusted to a pH of 9 with ammonia solution. The pH of the solution was then adjusted to 4 with concentrated hydrochloric acid and the precipitated solid collected by filtration to give the title compound (8.7 g).

EXAMPLE 4

Preparation of

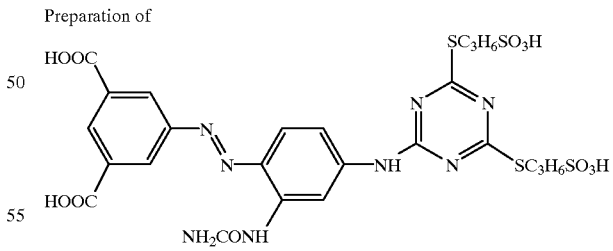

i) Preparation of

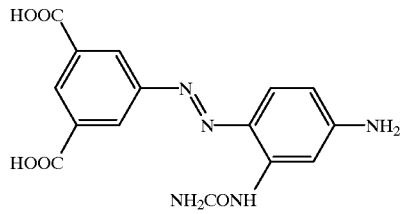

5-Aminoisophthalic acid (36.2 g) was dissolved with stirring in water (400 cm³) the pH of which was adjusted to 8 to 9 with caustic soda solution. Sodium nitrite (15 g) was added and stirred to dissolve. Concentrated HCI (100 cm³) in ice was added at 0 to 10° C. and the mixture was stirred for 2 hours also at 0 to 10° C. to diazotise. The excess sodium nitrite was removed with sulphamic acid.

m-Ureidoaniline (57.2 g) was stirred in water (400 cm³) at pH 7 and added at 0 to10° C. with stirring to the diazo suspension the pH of which was adjusted to 4 to 5 with sodium acetate. The mixture was allowed to warm to room temperature over 16 hours. A solid was collected by filtration under reduced pressure and dried in an oven at 60° C. for 16 hours to give 153.3 g of product.

ii) The compound (8.6 g) from i) above was added to water (300cm³) at pH 8. The resulting solution added slowly to a stirred suspension of cyanuric chloride (4.6 g) in acetone (50 cm³) and poured on to a mixture of ice and water (100 g) at 0 to 10° C. and at pH 6 to7 and stirred for 2 hours also at 0 to 10° C. and pH 6 to 7 until TLC showed the reaction was complete.

3-Mercapto-1-propane sulphonic acid (4.8 g) was dissolved in water (100 cm³) and added to the mixture which was then stirred for 16 hours at pH of 8 to 9 and room temperature.

A further portion of 3-mercapto-1-propane sulphonic acid (13.5 g) in water (100 cm³) was added and the mixture was warmed to 50° C., kept at pH 8 to 9 for 6 hours and then was cooled to room temperature.

A solid was isolated as described in the last paragraph of Example 3 above, to give the title compound (6.3 g).

EXAMPLE 5

Preparation of

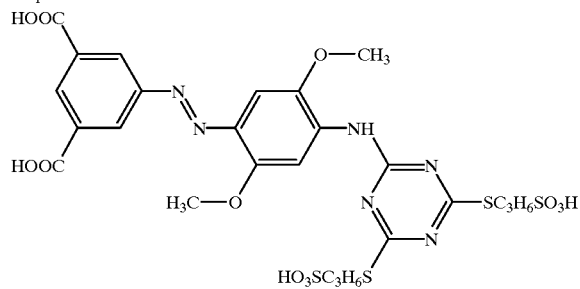

i) Preparation of

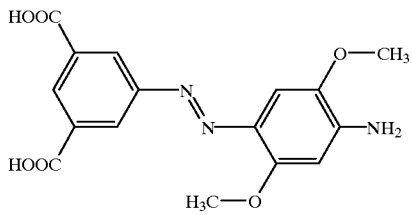

5-Aminoisophthalic acid (27.1 g) was dissolved with stirring in water (200 cm³) at pH 8 to 9. Sodium nitrite solution (75 cm³, 2N) was added and the mixture was poured slowly onto a stirred solution of hydrochloric acid (75 cm³) in ice and the diazotisation was allowed to proceed for 2 hours at 0 to 10° C. Excess nitrate was removed with sulphamic acid.

2,5-Dimethoxyaniline (23 g) was dissolved with stirring in warmed ethanol (300 m³) and the solution was cooled and added slowly to diazo solution prepared above. The mixture was stirred for 16 hours. A solid was collected by filtration under reduced pressure and was dried in an oven at 60° C. for 16 hours.

ii) The compound (14.7 g) from i) above was added to water (250 cm³) at pH 8–9. The resulting suspension was added to a suspension of cyanuric chloride (4.6 g) in acetone (50 cm³) and poured onto a mixture of ice and water (100 cm³) at 0 to 10° C. A few drops of calsolene oil were added to the mixture and the pH was adjusted to 8 to 9.

3-Mercapto-1-propane sulphonic acid (4.8 g) was added and the mixture was stirred for 16 hours at room temperature and a pH of 8 to 9.

A further portion of 3-mercapto-1-propane sulphonic acid (13.5 g) was added and the mixture was stirred at pH 8 to 9 and 50° C. for 6 hours and then was cooled to room temperature.

Sodium chloride solution (20% w/v) was added and the reaction mixture was acidified to pH 3 with concentrated HCl and strirred for 16 hours at room temperature. A solid was collected by filtration under reduced pressure. The solid was restirred in water (400 cm³) at pH 9 with ammonia solution and poured onto concentrated HCl (30 cm³) and stirred for 10 minutes. A solid was collected from the mixture by filtration under reduced pressure and dried in an oven at 60° C. for 16 hours to give the title compound (11.8 g).

EXAMPLE 6

Preparation of

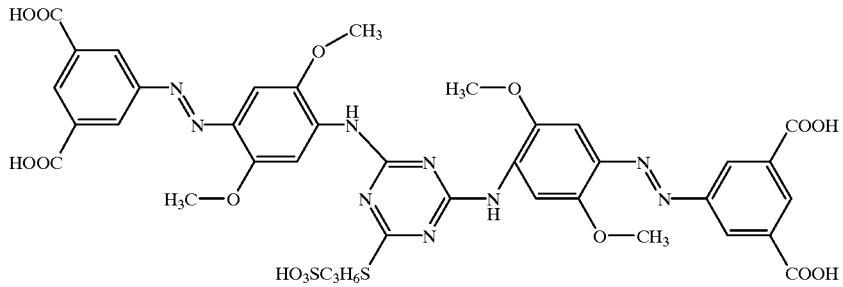

i) Preparation of

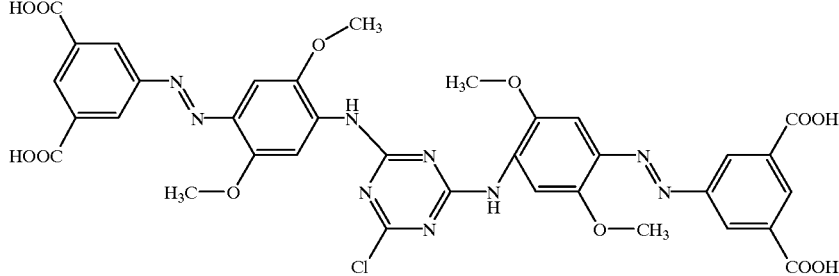

The compound (14.7 g) prepared as described in Example 5 i) above, was added to water (500 cm$^3$) at pH 10. The solution was filtered to remove a small amount of insoluble material and the filtrate was cooled to 0 to 10° C. and then added slowly to a suspension of cyanuric chloride (4.6 g) in acetone (50 cm$^3$). The mixture was stirred at 0 to 10° C. and at pH 8 to 9 for 1.5 hours. Then a further portion of cyanuric chloride (1 g) in acetone (10 cm$^3$) was added and the mixture was stirred for a further 0.5 hours at 0 to 10° C. and pH 8 to 9.

3-Mercapto-1-propanesulphonic acid (13.5 g) was added and the mixture was warmed to 70 to 75° C. for 6 hours and then was cooled to room temperature.

The mixture was filtered to remove insoluble material and a solid was isolated from the filtrate as described in the last paragraph of Example 2 above (using 600 cm$^3$ water and 40 cm$^3$ HCl) to give the title compound (17.7 g).

EXAMPLE 7

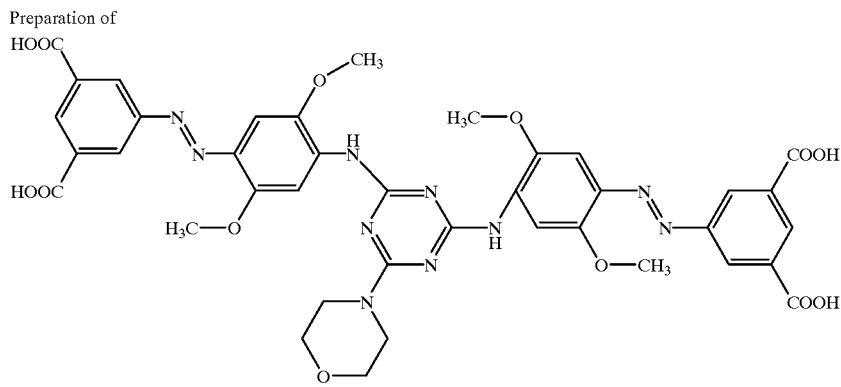

Preparation of

A further portion of the compound (14.7 g) [from Example 5 i) above] in water (500 cm$^3$) at pH 10 was added and the mixture was stirred at 45 to 50° C. and pH 7 to 8 for 16 hours.

The procedure of Example 6 was repeated except that at stage iii) morpholine (13.2 g) was used in place of the 3-mercapto-1-propanesulphonic acid to give the title compound (15.0 g).

EXAMPLE 8

Preparation of

[Chemical structure: bis-azo triazine dye with HOOC groups, H3C methyl substituents, HO3SC3H6S (sulfopropylthio) group on triazine]

The compound (7.5 g) prepared as described in Example 1 i) above, was dissolved with stirring in water (250 cm³) at pH 8. The solution was added slowly to a stirred suspension of cyanuric chloride (4.6 g) in acetone (500 cm³). The resultant mixture was poured onto ice (100 g) and stirred at 0 to 10° C. and pH 7 to 8 for 1 hour until TLC showed the reaction was complete.

A further portion of the compound (7.5 g) [from Example 1 i) above] in water (250 cm³) was added and the mixture was warmed to 45 to 50° C. and pH 7 to 8 for 16 hours.

3-Mercapto-1-propanesulphonic acid (13.5 g) in water (100 cm³) was added and the mixture was stirred at 45 to 50° C. and pH 8 to 9 for 8 hours and then was cooled to room temperature.

Sodium chloride solution (20% w/v) was added to the mixture and a solid was isolated as described in the last paragraph of Example 2 above (using 400 cm³ water and 40 cm³ HCl) to give the title compound (16.4 g).

The compound (12.7 g) prepared as described in Example 2 i) above, was dissolved with stirring in water (450 cm³) at pH 8. The solution was filtered to remove a small amount of insoluble material. The filtrate was added to a stirred suspension of cyanuric chloride (6.9 g) in acetone (100 cm³) and poured onto ice (150 g). The resultant mixture was stirred at 0 to 10° C. and pH 7 to 8 for 2 hours until TLC showed the reaction was complete.

A further portion of the compound (12.7 g) [from Example 2 i) above] in water (450 cm³) at pH 8 was added to the mixture which was stirred at pH 7 to 8 and 45° C. for 16 hours.

Morpholine (18g) was added and the mixture was stirred at 65 to 75° C. for 60 hours and then was cooled to room temperature.

A solid was isolated from the mixture as described in the last paragraph of Example 2 above, to give the title compound (23.9 g).

EXAMPLE 9

Preparation of

[Chemical structure: bis-azo triazine dye with HOOC groups, CH3CONH and NHCOCH3 substituents, morpholino group on triazine]

EXAMPLE 10

Preparation of

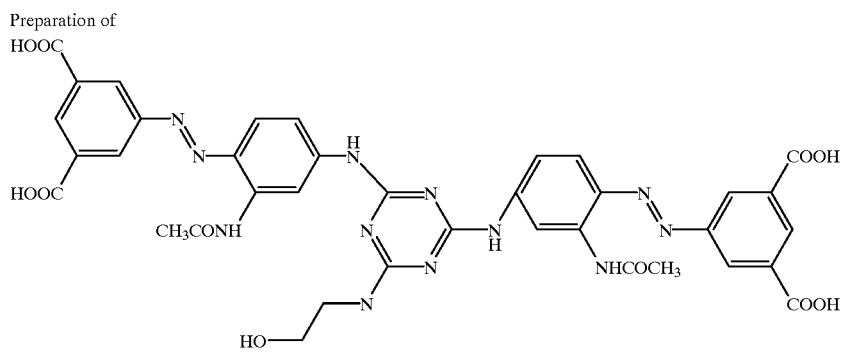

This compound was prepared as described for Example 9 except that 2-hydroxyethylamine (12.8 g) was used in place of the morpholine.

EXAMPLE 11

Preparation of

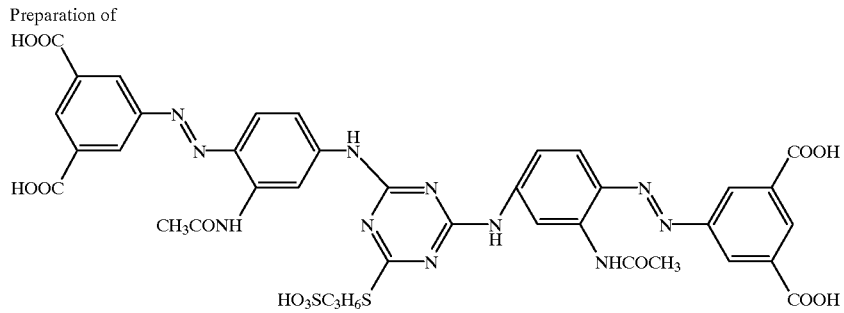

This compound was prepared as described for Example 9 except that 3-mercapto-1-propanesulphonic acid (36 g) was used in place of the morpholine.

EXAMPLE 12

Preparation of

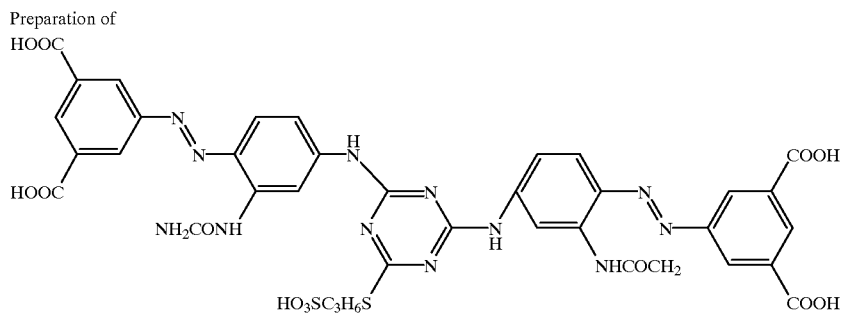

The compound (8.5 g) prepared as described in Example 4 i) above, was dissolved with stirring in water (250 cm$^3$) at pH 8. The solution was added slowly to a stirred suspension of cyanuric chloride (4.6 g) in acetone (50 cm$^3$) and poured onto ice (100 g). The resultant mixture was stirred at 0 to 10° C. and pH 7 to 8 for 1 hour until TLC showed the reaction was complete.

A further portion of the compound (8.5 g) [from Example 4 i) above] in water (250 cm$^3$) was added and the mixture was warmed to 45 to 50° C. and pH 7 to 8 for 16 hours.

3-Mercapto-1-propanesulphonic acid (13.5 g) in water (100 cm$^3$) was added and the mixture was stirred at 45 to 50° C. and pH 8 to 9 for 6 hours and then was cooled to room temperature.

Sodium chloride solution (20% w/v) was added to the mixture and a solid was isolated as described in the last paragraph of Example 2 above (using 400 cm$^3$ water and 40 cm$^3$ HCl) to give the title compound (11.2 g).

EXAMPLE 13

Preparation of

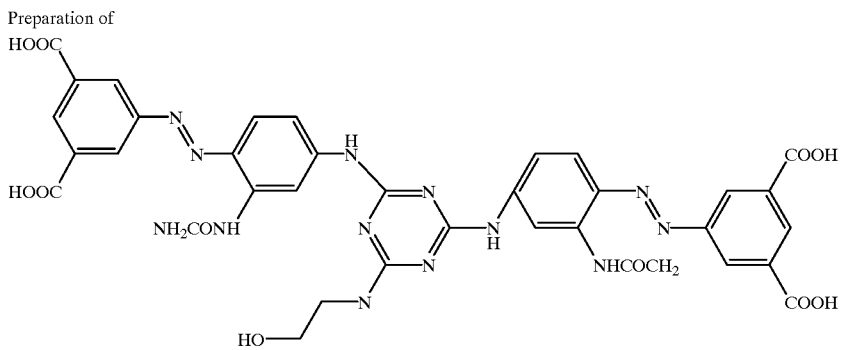

This compound was prepared as described for Example 12 except that 2-hydroxyethylamine (4.8 g) was used in place of the 3-mercapto-1-propanesulphonic acid.

EXAMPLE 14

Preparation of

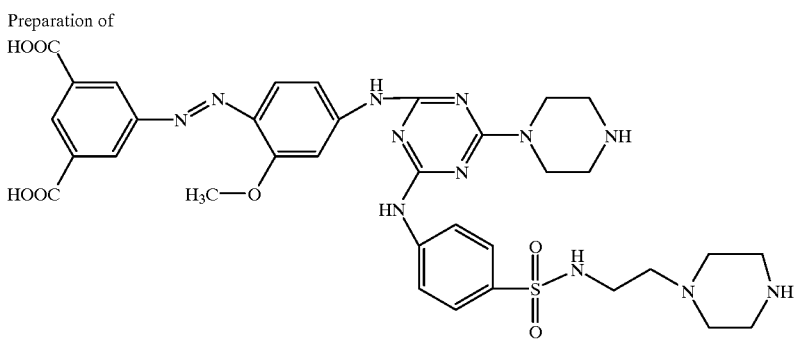

i) Preparation of

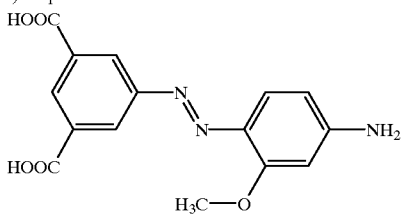

5-Aminoisophthalic acid (27.1 g) was dissolved in water (200 cm³) with stirring and the pH was adjusted to 8.0 with NaOH solution, then sodium nitrite solution (75 ml 2N) was added. The resulting solution was poured onto a mixture of ice, water and HCl (75 cm³) over 10 minutes at a temperature of between 0 to 10° C. and stirred for 2 hours also at 0 to 10° C. Excess nitrite was removed with sulphamic acid.

m-Anisidine (21.4 g) was dissolved with stirring in methanol (200 cm³). This solution was poured into the above prepared diazo solution at a temperature of between 0 to 10° C. The mixture was stirred overnight whilst being warmed slowly to room temperature, and then filtered to collect a solid. The solid was washed with brine solution and dried under reduced pressure to give 99.8 g of product.

ii) Preparation of:

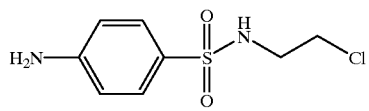

N-Acetylsulphanilyl chloride (116.5 g) was added to water (600 ml) at room temperature and the mixture was stirred. 2-Chloroethylamine hydrogen chloride (87 g) was dissolved in water (200 ml) and this solution was added to the sulphanilyl chloride mixture formed above. The pH of the mixture was adjusted to pH 7.0 to 7.5 with a 15% solution of sodium carbonate and the mixture was stirred overnight at room temperature. The precipitate formed was collected by filtration under reduced pressure and then wasted with water (2 l) to give a damp paste.

The paste was stirred into 2 N HCl (1 l) at a temperature of 80 to 85° C. for 3 hours, until TLC showed the hydrolysis was complete. The solution was cooled to 0 to 10° C. and the pH of the mixture was adjusted to pH 8.5 by adding solid sodium carbonate, whilst the temperature of the mixture was kept below 10° C. A solid was collected by filtration under reduced pressure, washed with water (3 l) and dried in an oven at 70° C. to give 58.5 g of product.

iii) The compound (7.1 g) from i) above was added to water (150 cm³) at pH 8. The resulting solution was added slowly to a stirred suspension of cyanuric chloride (2.3 g) in acetone (50 cm³). The mixture was then poured onto a mixture of ice and water (100 g) at 0 to 10° C. and at pH 6 to 7 and stirred for 2 hours also at 0 to10° C. and pH 6 to 7 until TLC showed that the reaction was complete.

The compound (2.9 g) from ii) above was dissolved in a mixture of water (50 cm³) and methanol (150 cm³). This solution was added at pH 6 to 7 and room temperature to the dichloro suspension formed above which was then stirred at pH 6 to 7 and 30° C. overnight, until TLC showed that the reaction was complete.

Piperazine (20g) was added and the mixture was warmed slowly to 70° C. for 4 hours and then was cooled to room temperature. The mixture was neutralised to pH 7 with concentrated HCl to form a precipitate which was collected by filtration under reduced pressure.

The solid product was added to water (400 cm³) to form a slurry the pH of which was adjusted to 9 with ammonia solution. The slurry was poured onto concentrated HCl (30 cm³) and stirred for 10 minutes. A solid was collected from the slurry by filtration under reduced pressure. The slurrying procedure was repeated twice more to obtain a solid which was re-stirred in water (400 ml) adjusted to pH 9 with ammonia liquid and poured onto concentrated HCl (40 cm³) and stirred for 10 minutes. A solid was collected by filtration under reduced pressure and dried overnight in an oven at 60° C. to give the title compound (8.7 g).

EXAMPLE 15

Preparation of

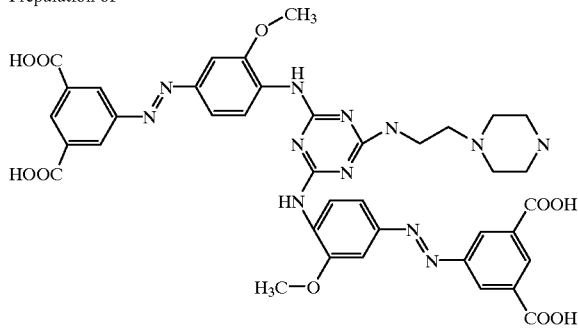

i) Preparation of

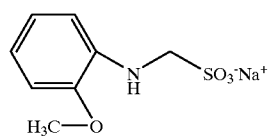

Sodium bisulphite (84.2 g) was added to water (320 ml) followed by 0.8 M formaldehyde solution (71.3 g) with stirring. The mixture was warmed to 70° C., o-anisidine (98.4 g) was added and then was stirred at 70 to 80° C. for 15 minutes. A solid was collected by filtration under reduced pressure, washed with ethanol (500 ml) and dried overnight in an oven at 60° C. to give 156.5 g of product.

ii) Preparation of

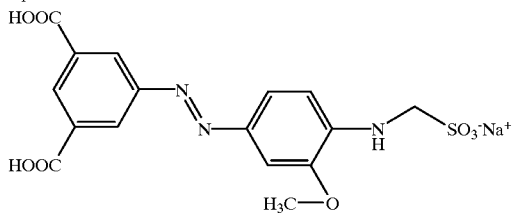

5-Aminoisophthalic acid (36.5 g) was dissolved in water (800 cm³) with stirring and the pH was adjusted to 8.0 with NaOH solution, then sodium nitrite (14 g) was added. The resulting solution was poured onto a mixture of concentrated HCl (60 cm³) in ice (100 g) at a temperature of between 0 to10° C. and stirred for 2 hours also at 0 to 10° C. Excess nitrite was removed with a 10% solution of sulphamic acid.

The compound (47.8 g) from i) above was dissolved in water (200 cm³). This solution was poured into the above prepared diazo suspension at a temperature of between 0 to 10° C. The mixture was stirred at pH 6 to 7 whilst being warmed slowly to room temperature and then was acidified to pH 4.0 with concentrated HCl. The mixture was filtered under reduced pressure to give a paste which was used directly in the next step.

iii) Preparation of

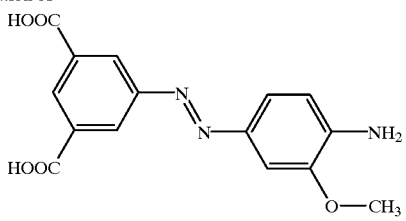

The paste from ii) above was stirred in water (1.5 l) with NaOH pellets (80 g). The mixture was warmed to 75 to 80° C. for 3 hours until TLC showed that the reaction was complete. The mixture was cooled to room temperature, acidified to pH 4.0 with concentrated HCl to form a precipitate which was collected by filtration under reduced pressure and dried overnight in an oven at 60° C. to give 70.4g of product.

iv) The compound (15.3 g) from iii) above was added to water (300 cm³) at pH 8. The resulting solution was added slowly to a stirred suspension of cyanuric chloride (9.2 g) in acetone (200 cm³). The mixture was then poured onto a mixture of ice and water (200 g) at 0 to 10° C. and at pH 7 and stirred for 4 hours also at 0 to10° C. and pH 7 until TLC showed that the reaction was complete.

A further portion of the compound (15.3 g) from iii) above was dissolved in water (300 cm³) at pH 8. This solution was added at pH 7 and 30° C. to the dichloro suspension formed above which was then stirred at pH 7 and 30° C. overnight.

1-(2-Aminoethyl)piperazine (39.5 g) was added, and the mixture was warmed to 70±5° C. for 6 hours and then cooled to room temperature.

The mixture was acidified to pH 4.0 with concentrated HCl to form a precipitate which was collected by filtration under reduced pressure. The solid product was purified as described in the last paragraph of Example 14 iii) above to give the title compound (20.0 g).

EXAMPLE 16

Preparation of

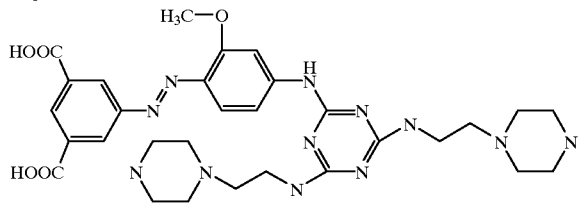

The compound (14.2 g) prepared as described in Example 14 i) above, was dissolved in water (300 cm³) the pH of which was adjusted to 8.0 with NaOH. The resulting solution was added over 15 minutes to a solution of cyanuric chloride (4.6 g) in acetone (50 cm³). The mixture was then poured onto ice (100 g) and stirred at 0 to 10° C. for 2 hours at pH 6 until TLC showed that the reaction was complete.

1-(2-Aminoethyl)piperazine [4.2g] was added to the reaction mixture which was then stirred at room temperature and pH 9 overnight.

A further portion of 1-(2-aminoethyl)piperazine (39.5 g) was added and the mixture was warmed to 70±5° C. for 6 hours and then cooled to room temperature.

The mixture was acidified to pH 6.0 with concentrated HCl to form a precipitate which was collected by filtration under reduced pressure. The solid product was added to water (400 cm³) to form a slurry the pH of which was adjusted to 9 with ammonia solution. The slurry was poured onto concentrated HCl (20 cm³) and stirred for 10 minutes. A solid was collected from the slurry by filtration under reduced pressure. The above slurrying procedure was repeated twice more but the final time the slurry was diluted to 1,000 ml with water and 2N NaOH was added until the solid dissolved. A solid was collected by filtration under reduced pressure and dried overnight in an oven at 60° C. to give the title compound (17.2 g).

EXAMPLE 17

Preparation of

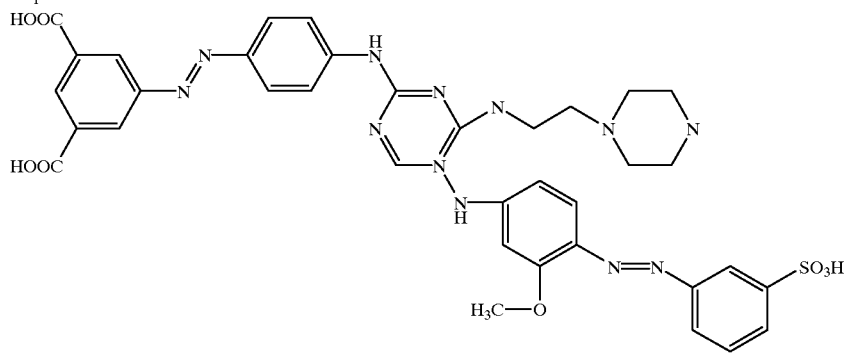

i) Preparation of

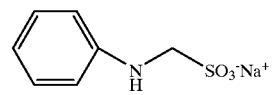

This compound was prepared as described for Example 15 (i) except that the equivalent molar amount of aniline was used in place of the o-anisidine.

ii) Preparation of

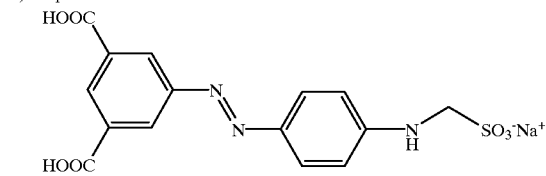

5-Aminoisophthalic acid (36.2 g) was dissolved in water (1 l) with stirring and the pH was adjusted to 8.0 with NaOH solution, then sodium nitrite (14 g) was added. The resulting solution was poured onto a mixture of concentrated HCl (60 cm³) in ice (100 g) at a temperature of between 0 to 10° C. and stirred for 2 hours also at 0 to 10° C. Excess nitrite was removed with a 10% solution of sulphamic adid.

The compound (50 g) from i) above was dissolved in water (400 cm³). This solution was poured into the above prepared diazo suspension at a temperature of between 0 to10° C. The reaction, mixture was stirred overnight at pH 7 whilst being warmed slowly to room temperature. Then the pH was adjusted 6.0 with concentrated HCl. and 20% w/v NaCl was added. The mixture was slowly filtered under reduced pressure to give a paste which was used directly in the next step.

ii) Preparation of

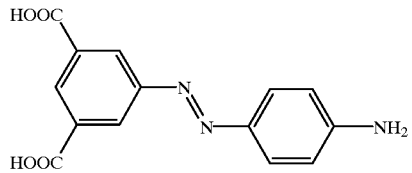

The paste from i) above was stirred in water (2 l) with NaOH pellets (80 g). The mixture was warmed to 70 to 80° C. for 3 hours until TLC showed that the reaction was complete. The mixture was cooled to room temperature and 20% w/v NaCl was added. The pH of the mixture was slowly adjusted to 4.0 with concentrated HCl to form a precipitate which was collected by filtration under reduced pressure and dried overnight in an oven at 60° C. to give 220.4 g of product.

iv) Preparation of

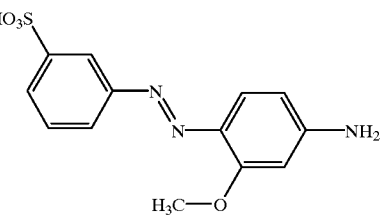

Metanilic acid (13.2 g) was stirred in water (100 cm³) with stirring and the pH was adjusted to 7.0 to dissolve the acid. Sodium nitrite solution (37.5 ml, 2N) was added. The resulting solution was poured onto a mixture of concentrated HCl (37.5 cm³) in ice (50 g) at a temperature of between 0 to10° C. and stirred for 2 hours also at 0 to 10° C. Excess nitrite was removed with a 10% solution of sulphamic acid.

m-Anisidine was stirred in methanol (50 cm³) and this solution was poured into the above prepared diazo suspension. The reaction mixture was stirred overnight whilst being allowed to slowly warm to room temperature, and then was filtered and washed with a little saturated brine. A solid was collected by filtration under reduced pressure and dried overnight in an oven at 60° C. to give 40.7 g of product.

v) The compound (15.3 g) from iii) above was added to water (300 cm³) at pH 8. The resulting solution was added slowly to a stirred suspension of cyanuric chloride (3.7 g) in acetone (50 cm³). The mixture was then poured onto a mixture of ice and water (100 g) at 0 to 10° C. and at pH 6 to 7 and stirred for 2 hours also at 0 to 10° C. and pH 6 to 7 until TLC showed that the reaction was complete.

The compound (6.1 g) from iv) above was added and the reaction mixture was warmed 30° C. and stirred at pH 7 overnight.

1-(2-Aminoethyl)piperazine (15.8 g) was added and the mixture was then warmed to 75±5° C. for 6 hours and then was cooled to room temperature.

The mixture was acidified to pH 4.0 with concentrated HCl to form a precipitate which was collected from the reaction mixture by filtration under reduced pressure. The solid product was purified as described in the last paragraph of Example 14 iii) above, to give the title compound (7.9 g).

EXAMPLE 18

Preparation of

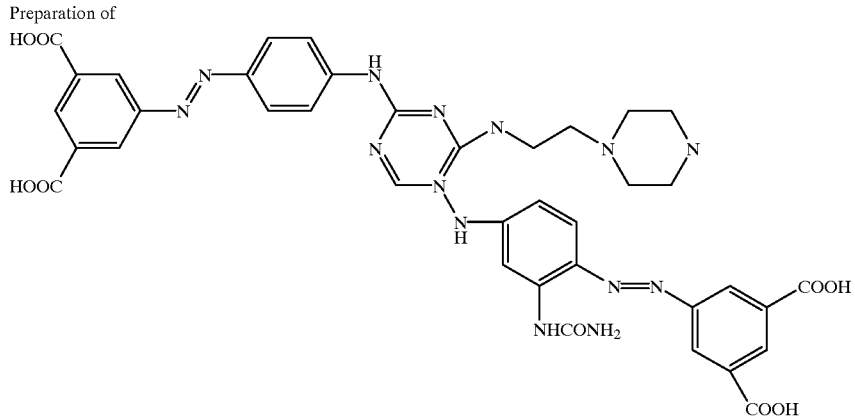

The compound (15.3 g) from ex. 17 iii) above was added to water (300 cm³) at pH 8. The resulting solution was added slowly to a stirred suspension of cyanuric chloride (3.7 g) in acetone (50 cm³). The mixture was then poured onto a mixture of ice and water (100 g) at 0 to 10° C. and at pH 6 to 7 and stirred for 2 hours also at 0 to10° C. and pH 6 to 7 until TLC showed that the reaction was complete.

The compound (9 g) from ex. 4 i) above was added and the reaction mixture was warmed to 30° C. and stirred at pH 7 overnight.

1-(2-Aminoethyl)piperazine (15.8 g) was added and the mixture was warmed to 75±5° C. for 6 hours and then was cooled to room temperature.

The mixture was acidified to pH 4.0 with concentrated HCl to form a precipitate which was collected from the reaction mixture by filtration under reduced pressure. The solid product was purified as described in the last paragraph of Example 14 iii) above, to give the title compound (13.4 g).

EXAMPLE 19

Preparation of

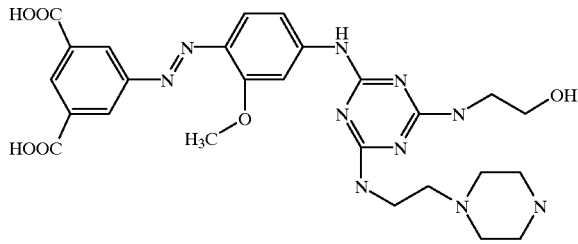

The compound (14.2 g) prepared as described in Example 14 i) above, was dissolved in water (300 cm³) the pH of which was adjusted to 8.0 with NaOH. The resulting solution was added over 15 minutes to a solution of cyanuric chloride (4.6 g) in acetone (50 cm³). The mixture was then poured onto ice (100 g) and stirred at 0 to 10° C. for 2 hours at pH 6 until TLC showed that the reaction was complete.

1-(2-Aminoethyl)piperazine [3.2 g ] was added to the reaction mixture which was then stirred at room temperature and pH 9 overnight.

Ethanolamine (9.2 g, 6M) was added and the mixture was warmed to 70±5° C. for 6 hours and then was cooled to room temperature.

The mixture was acidified to pH 4.0 with concentrated HCl to form a precipitate which was collected from the reaction mixture by filtration under reduced pressure. The solid product was purified as described in the last paragraph of Example 14 iii) above, to give the title compound (14.3 g).

Salts

The exemplified compounds 1 to 19, prepared as described above, were converted to their purified ammonium salts as follows. Each example was stirred in ammonia solution and a solid was collected by filtration. The crude ammonium salt thus obtained was then re-dissolved in ammonia solution the pH of which was adjusted to 9. The solution was dialysed until its conductivity was measured to be less than 100 $\mu Scm^{-1}$. The solution was then evaporated to dryness or filtered through Whatman GF/C and 0.45 $\mu$m filter papers to obtain a purified ammonium salt suitable for use directly in an ink as described below.

Inks

The effectiveness in ink jet printing of compounds of Formula (1) was demonstrated as follows. Inks separately comprising each exemplified dye were prepared by dissolving 2 parts of the ammonium salt, prepared as described above, in 98 parts of a mixture of water and 2-pyrrolidone (in a respective ratio of 90:10 by volume). The inks were printed onto plain paper using a thermal ink-jet printer to give a bright yellow print which had good optical density and light fastness.]

Further inks comprising the exemplified dyes may be may be prepared as described in the following tables in which the number in the first column (headed Ex. no.) denotes the example number of dye to be used in the ink. The dye may be in its free acid form andlor in the form of any suitable salt (e.g. ammonium salt). Numbers quoted in the second column onwards refer to the number of parts of the relevant ingredient and all parts are by weight. The inks may be applied to paper by thermal or piezo ink jet printing.

The following abbreviations are used in the tables:

| | | |
|---|---|---|
| PG = propylene glycol; | DEG = diethylene glycol; | NMP = N-methyl pyrollidone; |
| DMK = dimethylketone; | NaST = Na stearate | IPA = isopropanol; |
| MEOH = methanol; | 2P = 2-pyrollidone; | MIBK = methylisobutyl ketone; |
| CET = cetyl ammonium bromide; | TBT = tertiary butanol; | TDG = thiodiglycol; |
| BDL = butane-2,3-diol; | PHO = Na$_2$HPO$_4$; and | P12 = propane-1,2-diol. |

TABLE I

| Ex. no. | Dye | Water | PG | DEG | NMP | DMK | NaOH | Na ST | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |

TABLE I-continued

| Ex. no. | Dye | Water | PG | DEG | NMP | DMK | NaOH | Na ST | IPA | MEOH | 2P | MIBK |
|---|---|---|---|---|---|---|---|---|---|---|---|---|
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | 5 | 20 | | | | | 10 | | | |
| 9 | 2.4 | 75 | 3 | 4 | | 5 | | | | 6 | | 5 |
| 10 | 4.1 | 80 | | | 5 | 2 | 10 | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | 7 | | 0.3 | | 3 | | | |
| 19 | 5.4 | 69 | 2 | 20 | 2 | 1 | | | | | 3 | 3 |

TABLE II

| Ex. no. | Dye | Water | PG | DEG | NMP | CET | TBT | TDG | BDL | PHO | 2P | P12 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 8 | 4 | | | | | 0.12 | | |
| 5 | 3.1 | 82 | 4 | 8 | | 0.3 | | | | | | 6 |
| 6 | 0.9 | 85 | | 10 | | | | | 5 | 0.2 | | |
| 7 | 9.0 | 90 | | 5 | 5 | | | 0.3 | | | | |
| 8 | 4.0 | 70 | | 10 | 4 | | | | 1 | | 4 | 11 |
| 9 | 2.2 | 75 | 4 | 10 | 3 | | | | 2 | | 6 | |
| 10 | 10.0 | 91 | | | 6 | | | | | | 3 | |
| 11 | 9.0 | 76 | | 9 | 7 | | 3.0 | | | 0.95 | 5 | |
| 12 | 5.0 | 78 | 5 | 11 | | | | | | | 6 | |
| 13 | 5.4 | 86 | 5 | | 7 | | | | | | 7 | |
| 14 | 2.1 | 70 | 5 | 5 | 5 | 0.1 | 0.2 | 0.1 | 5 | 0.1 | 5 | |
| 15 | 2.0 | 90 | | 10 | | | | | | | | |
| 16 | 2.0 | 88 | | | | | | 10 | | | | |
| 17 | 5.0 | 78 | | | 5 | | | 12 | | | 5 | |
| 18 | 8.0 | 70 | 2 | | 8 | | | 15 | | | 5 | |
| 19 | 10.0 | 80 | | | | | | 8 | | | 12 | |

What is claimed is:

1. At least one compound of Formula (1):

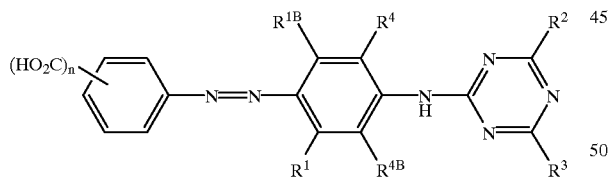

where n represents from 1 to 5 inclusive;

$R^1$, $R^{1B}$, $R^4$ and $R^{4B}$ each independently is H or one of the following substituents, optionally substituted:

$C_{1-8}$alkyl; $C_{1-8}$alkoxy; —NHCOH, $C_{1-8}$alkylcarbonylamino; and —NHCONR$^5$R$^6$ where $R^5$ and $R^6$ each independently is H, $C_{1-8}$alkyl and aryl; and $R^2$ and $R^3$ each independently is H or one of the following sustituents, optionally substituted:

$C_{1-8}$alkoxy; —NHC$_{1-8}$alkyleneOH, —SC$_{1-8}$—alkyleneSO$_3$H; —NHC$_{1-8}$alkyleneN(C$_{1-8}$alkyl)$_2$;

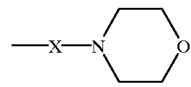

where X comprises one of the following: —NHC$_{1-8}$ alkylene; —NHphenylSO$_2$NHC$_{1-8}$alkylene; and a direct link,

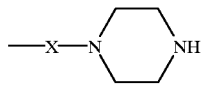

where X comprises one of the following: —NHC$_{1-8}$ alkylene; —NHphenylSO$_2$NHC$_{1-8}$alkylene; a direct link; and a moiety of Formula (2):

Formula (2)

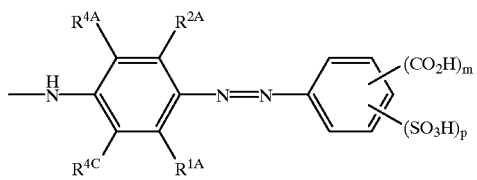

where m and p is each independently from 0 to 5 inclusive, provided that (m+p) is from 1 to 5 inclusive; and $R^{1A}$, $R^{2A}$, $R^{4A}$ and $R^{4C}$ each independently is one of those optionally substituted substituents as defined herein for $R^1$, $R^2$, $R^4$ and $R^{4B}$ respectively; a labile atom or group selected from the aroup consisting of halo, a sulphonic acid group, a thiocyano group, an optionally substituted quaternary ammonium group, and an optionally substituted pyridinium group; or a non-labile group selected from the group consisting of —$OR^7$, —$SR^8$ and —$NR^9R^{10}$;

$R^7$, $R^8$, $R^9$ and $R^{10}$ are each independently selected from the group consisting of H, alkyl, cycloalkyl, aryl, aralkyl, and $R^9$ and $R^{10}$ together with the nitrogen atom to which they are attached from an optionally substituted 5- or 6-membered ring;

where the optimal substituents herein comprise: $C_{1-4}$alkyl, $C_{1-4}$haloalkyl, $C_{1-4}$haloakoxy, $C_{1-4}$alkoxy, carboxy, sulpho, hydroxy, amino, mercapto, cyano, nitro and halo;

with the proviso that when one of $R^2$ and $R^3$ is a moiety of the Formula (2), then the other of $R^2$ or $R^3$ is:

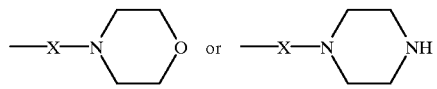

a moiety of Formula (2), or —$NHC_{1-8}$alkyleneN($C_{1-8}$alkyl)$_2$;

wherein:

$X^1$ is —$NHC_{1-8}$alkylene or —NHphenylSO$_2$NHC$_{1-8}$alkylene.

2. A compound according to claim 1 wherein:

$R^2$ and $R^3$ each independently is H or one of the following substituents, optionally substituted:

$C_{1-8}$alkoxy; —$NHC_{1-8}$alkyleneOH, —$S_{1-8}$-alkyleneSO$_3$H; —$NHC_{1-8}$alkyleneN($C_{1-8}$alkyl)$_2$;

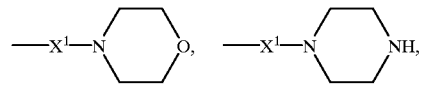

where X comprises one of the following: —NHC$_{1-8}$alkylene, —NHphenylSO$_2$NHC$_{1-8}$alkylene; and a direct link;

a labile atom or group selected from the group consisting of halo, a sulphonic acid group, a thiocyano group, a quaternary ammonium group, and an optionally substituted pyridinium group; or a non-labile group selected from the group consisting of —OH, —NH$_2$, —NH(C$_{1-4}$-alkyl) and -NH(hydroxy C$_{2-4}$alkyl);

where the optional substituents are as defined in claim 1.

3. A compound of Formula (1) as claimed in claim 1, in which:

n is 2;

$R^{1B}$ and $R^{4B}$ represent H;

$R^1$ represents H, $C_{1-8}$alkyl; $C_{1-8}$alkoxy; —NHCOH, $C_{1-8}$alkylcarbonylamino; or -NHCONR$^5$R$^6$;

$R^4$ represents H, $C_{1-8}$alkyl or $C_{1-8}$alkoxy; and $R^2$ and $R^3$ each independently represents: H; $C_{1-8}$alkoxy; -NHC$_{1-8}$alkyleneOH, —SC$_{1-8}$alkyleneSO$_3$H; —NHC$_{1-8}$alkyleneN(C$_{1-8}$alkyl)$_2$,

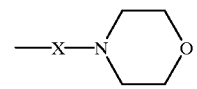

where X is —NHC$_{1-8}$alkylene; or a direct link,

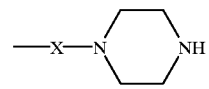

where X is —NHC$_{1-8}$alkylene; or a direct link; or a moiety of Formula(2) where m is 2, p is 0 and $R^{4C}$ represents H;

with the proviso that when one of $R^2$ and $R^3$ is a moiety of the Formula (2) where m is 2, p is 0 and $R^{4C}$ represents H, then the other of $R^2$ and $R^3$ is:

—$X^1$—N⟨O, —$X^1$—N⟨NH,

-SC$_{1-8}$-alkyleneSO$_3$H, —NHC$_{1-8}$alkyleneN(C$_{1-8}$alkyl)$_2$ or a moiety of Formula (2) where m is 2, p is 0 and $R^{4C}$ represents H; wherein $X^1$ is —NHC$_{1-8}$alkylene.

4. A mono azo dye of Formula (1) as claimed in claim 3, in which:

n is 2;

$R^{1B}$, $R^4$ and $R^{4B}$ are all H;

$R^1$ is H, $C_{1-4}$alkyl, $C_{1-4}$alkoxy, NHCOH, $C_{1-4}$alkylcarbonylamino, or —NHCONR$^5$R$^6$;

where $R^5$ and $R^6$ is each independently: H, $C_{1-4}$alkyl or aryl; and $R^2$ and $R^3$ is each independently: —NHC$_{1-4}$alkyleneOH, —SC$_{1-4}$alkyleneSO$_3$H, —NHC$_{1-4}$alkyleneN(C$_{1-4}$alkyl)$_2$; or

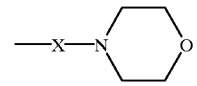

where X is —NHC$_{1-4}$alkylene or a direct link.

5. A bisazo dye of Formula (1) as claimed in claim 3, in which:

n is 2;

$R^{1B}$ and $R^{4B}$ are both H;

$R^1$ and $R^{1A}$ is each independently: H, $C_{1-4}$alkoxy, NHCOH, $C_{1-4}$alkyicarbonylamino, or NHCONR$^5$R$^6$;

where $R^5$ and $R^6$ is each independently H, $C_{1-4}$alkyl or aryl;

$R^4$ and $R^{4A}$ is each independently H, $C_{1-4}$ alkyl or $-C_{1-4}$ alkoxy;

$R^2$ is a moiety of Formula (2) where m is 2, p is 0 and $R^{4C}$ is H;

$R^{2A}$ is H, or $C_{1-4}$alkoxy; and $R^3$ is: $-SC_{1-4}$alkyleneSO$_3$H, $-NHC_{1-4}$alkyleneN($C_{1-4}$-alkyl)$_2$; or

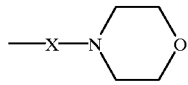

where X is $-NHC_{1-4}$alkylene.

6. A monoazo dye of Formula 1, as claimed in claim 3, in which:

n is 2;

$R^{1B}$, $R^4$ and $R^{4B}$ are all H;

$R^1$ is H, $C_{1-4}$alkyl, $C_{1-4}$alkoxy, NHCOH, $C_{1-4}$alkylcarbonylamino, or NHCONR$^5$R$^6$ where $R^5$ and $R^6$ is each independently H, $C_{1-4}$alkyl or aryl; and $R^2$ and $R^3$ is each independently: $-NHC_{1-4}$alkyleneOH, $-SC_{1-4}$alkyleneSO$_3$H, $-NHC_{1-4}$alkyleneN($C_{1-4}$-alkyl)$_2$

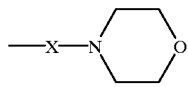

where X is $-NHC_{1-4}$alkylene or a direct link; or

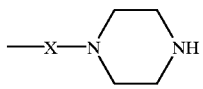

where X is $-NHC_{1-4}$alkylene or a direct link;

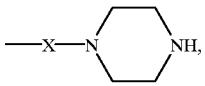

provided that at least one of $R^2$ and $R^3$ is

7. A bisazo dye of Formula 1, as claimed in claim 3, in which:

n is 2;

$R^{1B}$ and $R^{4B}$ are both H;

$R^1$ and $R^{1A}$ is each independently: H, $C_{1-4}$alkyl, $C_{1-4}$alkoxy; $-NHCOH$, $C_{1-4}$alkylcarbonylamino or NHCONR$^5$R$^6$ where $R^5$ and $R^6$ is each independently H, $C_{1-4}$-alkyl or aryl;

$R^4$ and $R^{4A}$ is each independently H, $C_{1-4}$alkyl or $C_{1-4}$alkoxy;

$R^2$ is a moiety of Formula (2) where m is 2; p is 0 and $R^{4C}$ is H;

$R^{2A}$ is H; and $R^3$ is

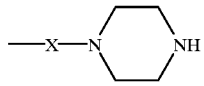

where X is $-NHC_{1-4}$alkylene.

8. An ink comprising at least one compound of Formula (1) as claimed in claim 1, 2, or 3, and a suitable medium.

9. A process for printing a substrate with an ink as claimed in claim 8, in which the ink is applied by ink Jet printing.

10. A substrate printed with an ink as claimed in claim 8, the substrate selected from the group consisting of one or more of: paper, an overhead projector slide and a textile material.

11. A process for the colouring a textile material with an ink as claimed in claim 8, the process comprising the steps of:

i) applying the ink to the textile material by inkjet printing; and ii) heating the textile material at a temperature from 50° C. to 250° C. to fix the dye on the material.

12. A textile material coloured with an ink as claimed in claim 8.

13. A process for preparing a mono azo compound of Formula (1) as claimed in 1, 3, 4, or 6, in which $R^3$ is other than a moiety of Formula (2), the process comprising condensing a compound of Formula (3);

Formula (3)

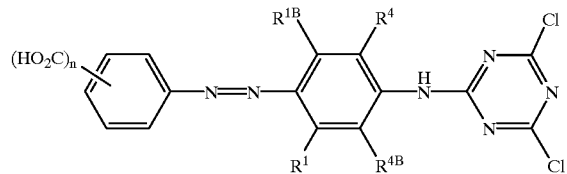

with at least one compound selected from the group consisting of those of Formulae R$^2$H and R$^3$H.

14. A process for preparing a bisazo compound of Formula (1) as claimed in any of claims 1, 3, 5 or 7, in which R2 is a moiety of Formula (2), the process comprising condensing a compound of Formula ($^1$) in which $R^3$ is Cl with a compound of Formula R$^3$H where $R^3$ is other than Cl.

* * * * *